United States Patent
Koteyar et al.

(10) Patent No.: US 10,158,861 B2
(45) Date of Patent: Dec. 18, 2018

(54) SYSTEMS AND METHODS FOR IMPROVING VIDEO COMPRESSION EFFICIENCY

(71) Applicant: Evertz Microsystems Ltd., Burlington (CA)

(72) Inventors: Sunil Koteyar, Burlington (CA); Rakesh Patel, Mississauga (CA); Tarek Amara, Burlington (CA); Alpesh Patel, Mississauga (CA)

(73) Assignee: Evertz Microsystems Ltd., Burlington (CA)

( * ) Notice: Subject to any disclaimer, the term of this patent is extended or adjusted under 35 U.S.C. 154(b) by 63 days.

(21) Appl. No.: 15/422,983

(22) Filed: Feb. 2, 2017

(65) Prior Publication Data

US 2017/0223363 A1    Aug. 3, 2017

Related U.S. Application Data

(60) Provisional application No. 62/290,668, filed on Feb. 3, 2016.

(51) Int. Cl.
*H04N 19/159* (2014.01)
*H04N 19/115* (2014.01)
*H04N 19/136* (2014.01)

(52) U.S. Cl.
CPC ......... *H04N 19/159* (2014.11); *H04N 19/115* (2014.11); *H04N 19/136* (2014.11)

(58) Field of Classification Search
CPC ... H04N 19/159; H04N 19/115; H04N 19/136
See application file for complete search history.

(56) References Cited

U.S. PATENT DOCUMENTS

| | | | |
|---|---|---|---|
| 6,057,884 A | 5/2000 | Chen et al. | |
| 6,873,368 B1 | 3/2005 | Yu et al. | |
| 8,446,484 B2 | 5/2013 | Muukki et al. | |
| 2008/0240249 A1* | 10/2008 | Chien | H04N 19/176 375/240.17 |
| 2013/0050415 A1 | 2/2013 | Wang | |
| 2013/0156113 A1 | 6/2013 | Ismael-Mia et al. | |
| 2016/0037160 A1* | 2/2016 | Hori | H04N 19/147 375/240.25 |
| 2016/0295250 A1* | 10/2016 | Yang | H04N 21/23438 |
| 2017/0272749 A1* | 9/2017 | Pettersson | H04N 19/119 |

* cited by examiner

*Primary Examiner* — Tat C Chio
(74) *Attorney, Agent, or Firm* — Bareskin & Parr LLP/S.E.N.C.R.L., s.r.l.

(57) ABSTRACT

Various embodiments are described herein for methods and systems for operating a video compression system. In one example embodiment, the method of operating a video compression system includes determining an encoding complexity limit for an encoding module within the video compression system, determining signal complexity of an input signal to the video compression system, comparing the encoding complexity limit to the signal complexity at an adaptive scaling module within the video compression system, and if the signal complexity is determined to be greater than the encoding complexity limit, manipulating the resolution of the input signal at the adaptive scaling module to generate an output signal.

18 Claims, 6 Drawing Sheets

SYSTEMS AND METHODS FOR IMPROVING VIDEO COMPRESSION EFFICIENCY

CROSS-REFERENCE TO RELATED APPLICATION

This application claims the benefit of U.S. Provisional Patent Application No. 62/290,668, filed Feb. 3, 2016. The entire contents of U.S. Provisional Patent Application No. 62/290,668 are incorporated by reference herein.

TECHNICAL FIELD

The described embodiments relate to methods and systems for improving video compression efficiency, and in particular, to methods and systems for improving video compression efficiency using adaptive spatial down-scaling of video content.

BACKGROUND

The popularity of video content continues to increase. In fact, video traffic over the internet (O.T.T.) represents almost 70% of all data traffic and is expected to reach 80% in the next 5 years. However, across all media types, video tends to be the most bandwidth-demanding and the most expensive to deliver to end consumers.

SUMMARY

In a broad aspect, at least one embodiment described herein provides a method of operating a video compression system, the method comprising: determining an encoding complexity limit for an encoding module within the video compression system; determining signal complexity of an input signal to the video compression system; comparing the encoding complexity limit to the signal complexity at an adaptive scaling module within the video compression system; and if the signal complexity is determined to be greater than the encoding complexity limit, manipulating the resolution of the input signal at the adaptive scaling module to generate an output signal.

In some embodiments, the method further comprises encoding the output signal at the encoding module to generate an encoded signal, wherein the encoding is carried out subsequent to the manipulation of the resolution of the input signal.

In some embodiments, the method further comprises transmitting the encoded signal to a decoding module via a communication network.

In some embodiments, if the encoding complexity limit is determined to be greater than the signal complexity, the method comprises encoding the input signal at the encoding module to generate an encoded signal.

In some embodiments, manipulating the resolution of the input signal comprises downscaling the input signal in a horizontal direction to generate the output signal.

In some embodiments, downscaling the input signal in a horizontal direction allows for a same codec to be used for compressing/decompressing the output signal as the input signal.

In some embodiments, downscaling the input signal in the horizontal direction is proportional to the signal complexity of the input signal.

In some embodiments, manipulating the resolution of the input signal comprises downscaling the input signal in a vertical direction.

In some embodiments, the method further comprises determining an instantaneous compression bitrate for the input signal; and manipulating the resolution of the input signal based on the instantaneous compression bitrate of the input signal.

In some embodiments, the decoding module decompresses the encoded signal to generate a decompressed signal and upscales the decompressed signal to an original resolution of the corresponding input signal.

In some embodiments, the decoding module is located at a set-top box at a consumer premises.

In some embodiments, determining the signal complexity of the input signal comprises determining spatial activity within the input signal.

In some embodiments, determining the signal complexity of the input signal comprises determining temporal activity within the input signal.

In some embodiments, determining the signal complexity of the input signal comprises determining scene changes within the input signal.

In some embodiments, determining the encoding complexity limit for an encoding module is based on a type of codec used within the video compression system.

In some embodiments, manipulating the resolution of the input signal comprises downscaling the input signal in a horizontal and a vertical direction.

In another aspect, in at least one embodiment described herein, there is provided a video compression system comprising a memory module; a video input module for receiving an input signal; an adaptive scaling module operable to: determine an encoding complexity limit for an encoding module; determine signal complexity of the input signal; compare the encoding complexity limit to the signal complexity; manipulate the resolution of the input signal if the signal complexity is determined to be greater than the encoding complexity limit; and generate an output signal; and an encoding module for encoding the output signal.

In another aspect, in at least one embodiment described herein, there is provided a computer-readable medium storing computer-executable instructions, the instructions for causing at least one processor to perform a method of operating a video compression system, the method comprising: determining an encoding complexity limit for an encoding module within the video compression system; determining signal complexity of an input signal to the video compression system; comparing the encoding complexity limit to the signal complexity at an adaptive scaling module within the video compression system; and if the signal complexity is determined to be greater than the encoding complexity limit, manipulating the resolution of the input signal at the adaptive scaling module to generate an output signal.

In another aspect, in at least one embodiment described herein, there is provided a method of operating a video compression system, the method comprising: determining an encoding bitrate limit for an encoding module within the video compression system; determining signal complexity of an input signal to the video compression system; comparing the encoding bitrate limit to the signal complexity at an adaptive scaling module within the video compression system; manipulating the resolution of the input signal at the adaptive scaling module to generate an output signal; and transmitting the output signal from the adaptive scaling module to an encoding unit for generating a compressed video stream with maximized overall viewable video quality.

In some embodiments, encoding the output signal at the encoding module to generate an encoded signal, wherein the encoding is carried out subsequent to the manipulation of the resolution of the input signal.

In some embodiments, the method further comprises transmitting the encoded signal to a decoding module via a communication network.

In some embodiments, the method further comprises encoding the input signal at the encoding module to generate an encoded signal.

In some embodiments, manipulating the resolution of the input signal comprises downscaling the input signal in a horizontal direction to generate the output signal.

In some embodiments, downscaling the input signal in a horizontal direction allows for a same codec to be used for compressing/decompressing the output signal as the input signal.

In some embodiments, downscaling the input signal in the horizontal direction is driven by the signal complexity of the input signal.

In some embodiments, manipulating the resolution of the input signal comprises downscaling the input signal in a vertical direction.

In some embodiments, the method further comprises determining an instantaneous compression bitrate for the input signal; and manipulating the resolution of the input signal based on the instantaneous compression bitrate of the input signal.

In some embodiments, the decoding module decompresses the encoded signal to generate a decompressed signal and upscales the decompressed signal to an original resolution of the corresponding input signal.

In some embodiments, the decoding module is located at a set-top box at a consumer premises.

In some embodiments, determining the signal complexity of the input signal comprises determining spatial activity within the input signal.

In some embodiments, determining the signal complexity of the input signal comprises determining temporal activity within the input signal.

In some embodiments, determining the signal complexity of the input signal comprises determining scene changes within the input signal.

In some embodiments, determining the encoding complexity limit for an encoding module is based on a type of codec used within the video compression system.

In some embodiments, manipulating the resolution of the input signal comprises downscaling the input signal in a horizontal and a vertical direction.

In some embodiments, the resolution of the input signal is manipulated on a frame by frame basis.

In some embodiments, the resolution of the input signal is manipulated on a group of frame basis.

In some embodiments, the resolution of the input signal is manipulated at a file level.

In another aspect, in at least one embodiment described herein, there is provided a video compression system comprising: a memory module; a video input module for receiving an input signal; an adaptive scaling module operable to: determine an encoding complexity limit for an encoding module; determine signal complexity of the input signal; compare the encoding complexity limit to the signal complexity; manipulate the resolution of the input signal; and generate an output signal; and an encoding module for encoding the output signal.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

Several embodiments of the present invention will now be described in detail with reference to the drawings, in which.

Figure 1A:
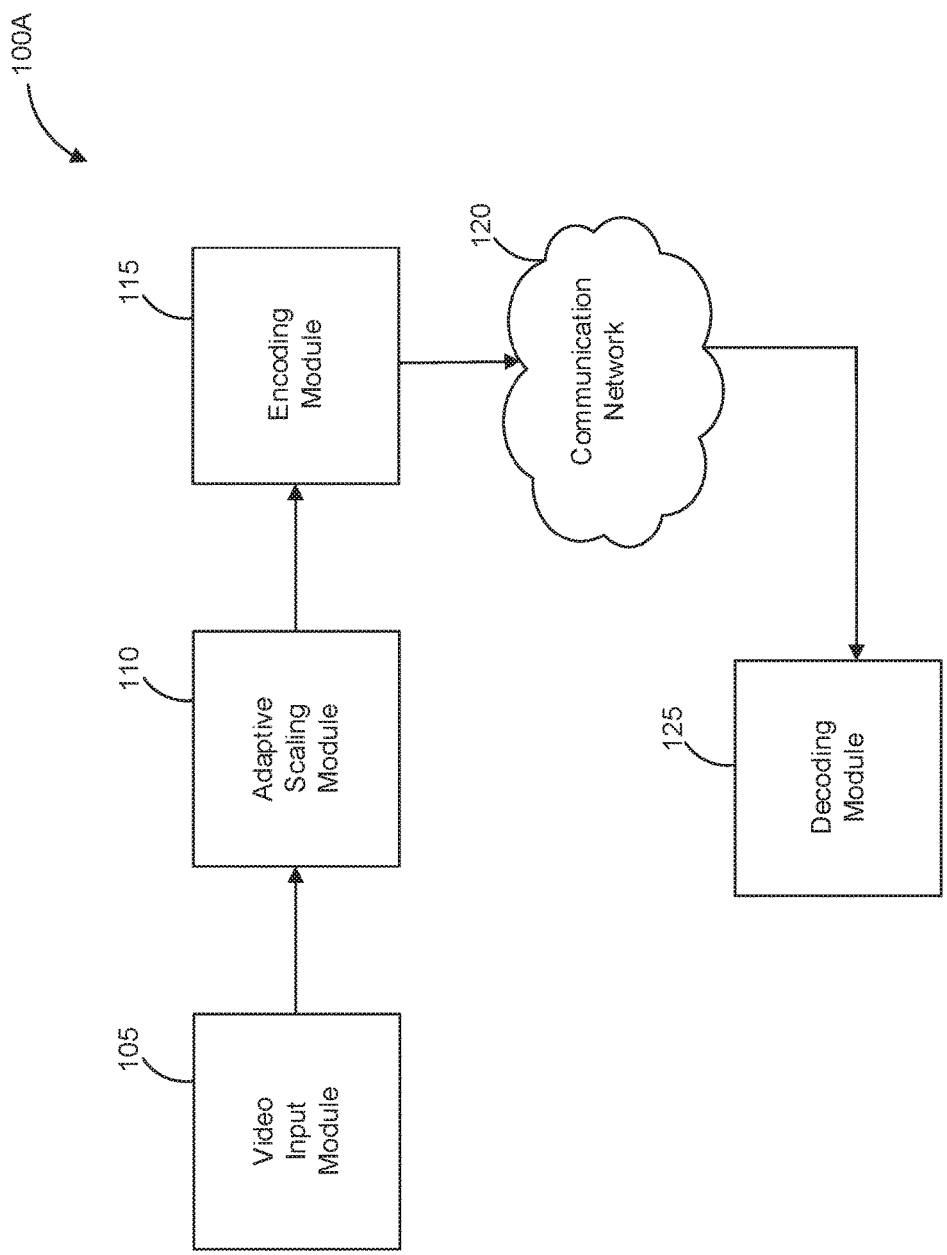
FIG. 1A is a block diagram of a video compression system in accordance with an example embodiment.

The drawings are provided for the purposes of illustrating various aspects and features of the example embodiments described herein. For simplicity and clarity of illustration, elements shown in the FIGS. have not necessarily been drawn to scale. Further, where considered appropriate, reference numerals may be repeated among the FIGS. to indicate corresponding or analogous elements.

DETAILED DESCRIPTION

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, network appliance, set-top box, embedded device, computer expansion module, personal computer, laptop, mobile telephone, smartphone or any other computing device capable of being configured to carry out the methods described herein.

Each program may be implemented in a high level procedural or object oriented programming or scripting language, or both, to communicate with a computer system. However, alternatively the programs may be implemented in assembly or machine language, if desired. The language may be a compiled or interpreted language. Each such computer program may be stored on a non-transitory computer readable storage medium (e.g. read-only memory, magnetic disk, optical disc). The storage medium so configured causes a computer to operate in a specific and predefined manner to perform the functions described herein.

While particular combinations of various functions and features are expressly described herein, other combinations of these features and functions are possible that are not limited by the particular examples disclosed herein, and these are expressly incorporated within the scope of the present invention.

As the term module is used in the description of the various embodiments, a module includes a functional block that is implemented in hardware or software, or both, that performs one or more functions such as the processing of an input signal to produce an output signal. As used herein, a module may contain sub-modules that themselves are modules.

Over the last few years, video consumption has exponentially increased. With the introduction of higher resolutions (for example, 4K and 8K resolutions), higher frames rates (for example, 120 and 240 frames per seconds), higher bit depth (for example, 14 bits video) and higher dynamic range video (HDR), new challenges have been introduced to the video delivery technology. It has become particularly challenging to efficiently compress high bandwidth demanding content. It is desirable to achieve better compression ratios of more than the 100:1, which is a typical ratio of today's video compression standards and techniques.

To resolve these issues, different standards are emerging and new techniques are being introduced to make lower bitrates achievable without losing the subjective video quality. The emergence of a handful of new standards and proprietary encoders is one way to achieve better compression ratio and save on precious bandwidth. However, deploying a completely different compression technology is a very expensive process for it needs to be introduced on both the content provider end and the consumer end. The process of making the consumer end compatible with new compression technologies would require a major set-top box (STB) update and/or replacement, which is an expensive, time-consuming and overall an undesirable process.

The various embodiments described herein generally relate to methods and systems for improving video compression efficiency in a cost-efficient and seamless manner. In particular, the systems and methods of various embodiments described herein allow lower bitrates to be used to compress video while keeping the same visual quality with higher bitrate. Furthermore, the systems and methods of various embodiments described herein are also compatible with any compression standard deployed today without requiring any changes on the decoder/receiver side, making this technology deployable seamlessly anywhere today and compatible with any future compression standard.

Typically, during video compression, the video quality degrades gradually from high bitrates to low bitrates. Video quality degradation from low to very low bitrates tends to be very rapid. One of the widely used solutions is to apply special low pass filters that reduce the high frequencies of the video content and make the video easier to encode. However, such a technique, while yielding some gain, creates compression artefacts, such as blurriness, in the video content. Furthermore, such a technique tends to be wasteful as it spends bits on areas with no entropy.

In the various embodiments described herein, a technique for maximizing video quality and thus improving video compression efficiency by adaptively scaling the video input before encoding is disclosed. The disclosed technique provides the advantage of being compatible with any video resolution and any video compression standard.

Reference is first made to FIG. 1A, illustrating a block diagram of a video compression system 100A in accordance with an example embodiment. System 100A comprises a video input module 105, an adaptive scaling module 110, an encoding module 115, a decoding module 125 and a communication network 120.

Communication network 120 may be any network or network components capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network (LAN), wide area network (WAN), a direct point-to-point connection, mobile data networks (e.g., Universal Mobile Telecommunications System (UMTS), 3GPP Long-Term Evolution Advanced (LTE Advanced), Worldwide Interoperability for Microwave Access (WiMAX), etc.), and others, including any combination of these.

The video input module 105 may consist of one or more servers with computing processing abilities and memory such as database(s) or file system(s). Although only one video input module 105 is shown for clarity, there may be multiple video input modules 105 or groups of video input modules 105 distributed over a wide geographic area and connected via, for example, communication network 120.

The video input module 105 may be any server that can provides access to video content. For example, the video input module 105 may comprise a server storing a wide variety of user-generated content, including movies, movie clips, TV shows, TV clips, music videos, video blogging and short original videos etc. The video content may be stored in any video resolution, such as 360p, 480p, 720p, 1080i or 1080p, etc. Likewise, the video content may be stored in any video format, such as Windows Media Video or Moving Picture Experts Group MPEG-4 Advanced Video Coding (MPEG-4 AVC), etc. The video input module 105 may be a server system capable of generating its own video content, or may be capable of receiving video content from other sources and storing the received content locally.

Encoding module 115 may be a storage and processing module that is operable to receive a video input from adaptive scaling module 110 and compress the received video input into a video coding format. Encoding module 115 may be operable to carry out a lossy or lossless compression. Encoding module 115 is further operable to forward the compressed video via the communication network 120.

Examples of video coding formats include H.262 or MPEG-2 Part 2 (formally known as ITU-T Recommendation H.262 and ISO/IEC 13818-2, also known as MPEG-2

Video), MPEG-4 Part 2 (formally ISO/IEC 14496-2), H.264 or MPEG-4 Part 10, High Efficiency Video Coding (HEVC), Theora (free lossy video compression format), Dirac (open and royalty-free video compression format), RealVideo RV40, VP8 (video compression format owned by Google), and VP9 (open and royalty-free video coding format owned by Google), etc.

Decoding module 125 may be a storage and processing module that is operable to receive a compressed video signal from the communication network 120 and decompress the received video input into its uncompressed format. The decoding module 125 is further operable to upscale the resolution of the decoded video signal before the video signal is sent to the display for the end user.

In scenarios where the compression carried out by the encoding module 115 is a lossy compression, the compressed video lacks some of the information present in the original video. Accordingly, when such a video signal is decompressed, the resulting video has a lower quality than the original, uncompressed video because there is insufficient information to accurately reconstruct the original video.

Adaptive scaling module 110 may be a storage and processing module that is operable to manipulate the resolution of one or more video signals prior to compression by the encoding module 115. Adaptive scaling module 110 is operable to manipulate the resolution of the video signals in horizontal, vertical or both directions. In some embodiments, it may be desirable to manipulate the resolution of the video signal in the horizontal direction only since a change in the horizontal resolution tends to have an unchanged effect on the subjective perception of the video signal.

Even though various embodiments disclosed herein refer to manipulating the resolution of the video signals in the horizontal direction, it will be understood that the same teachings can be applied to manipulate the resolution of the video signals in the vertical, or both horizontal and vertical directions.

In some cases, the adaptive scaling module 110 is operable to manipulate the resolution of the video signals by manipulating the resolution of one or more frames within each video signal. In some other cases, the adaptive scaling module 110 is operable to manipulate the resolution of the video signals by manipulating the resolution of one or more segments within each video signal.

As will be discussed in greater detail below, the adaptive scaling module 110 manipulates the resolution of the video content based on a number of factors, including complexity of the video content, selected bitrate, type of codec (i.e. encoder and decoder) in use, post encoded distribution channel bandwidth, viewing device location metrics such as viewing distance, screen size, lighting conditions, or a combination of these.

In the various embodiments illustrated herein, the adaptive scaling module 110 is operable to manipulate the resolution of the video signal by down-scaling the resolution of the video signal. For example, the adaptive scaling module 110 may be operable to downscale the horizontal resolution of a 1920×1080 video to 1440×1080 pixels, 1280×1080 pixels or 960×1080 pixels.

Figure 1B:
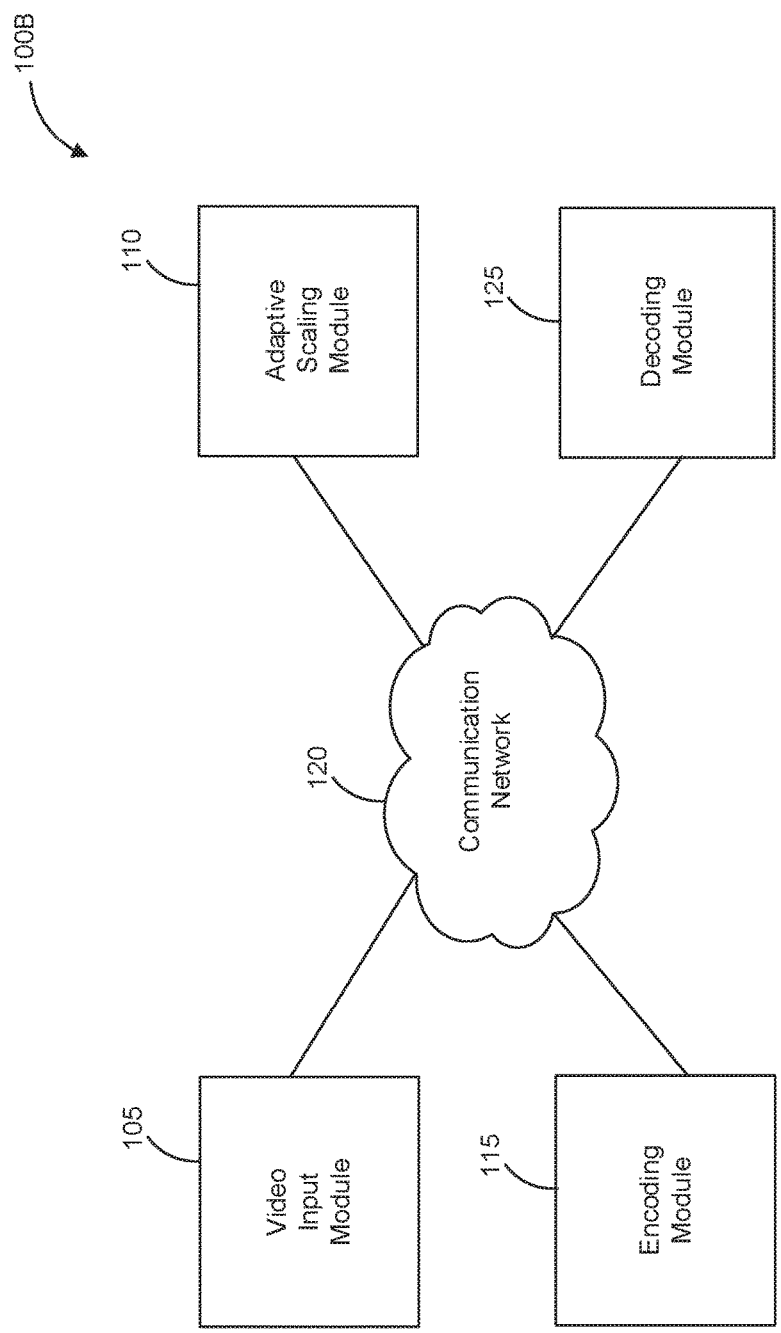
FIG. 1B is a block diagram of a video compression system in accordance with another example embodiment.

Reference is briefly made to FIG. 1B, which illustrates a block diagram of a video compression system 100B in accordance with an example embodiment. System 100B, similar to system 100A, comprises a video input module 105, an adaptive scaling module 110, an encoding module 115, a decoding module 125 and a communication network 120.

The difference between system 100A of FIG. 1A and system 100B of FIG. 1B lies in the geographical distribution of the components of the video compression systems of FIGS. 1A and 1B. In the embodiment of FIG. 1A, the video input module 105, the adaptive scaling module 110 and the encoding module 115 are located in a same geographical location, which is geographically removed from the decoding module 125. In some cases, the adaptive scaling module 110 and the encoding module 115 may be components within a single hardware device.

In the embodiment of FIG. 1A, the video input module 105, the adaptive scaling module 110 and the encoding module 115 may be located at the premises of the video content providers, including television broadcast providers, such as NBC, CBS, ESPN, HBO, CNN, etc., and/or Internet-based content providers, such as YouTube, Netflix, etc.

In the embodiment of FIG. 1B, all of the components within the video compression system, including the video input module 105, the adaptive scaling module 110, the encoding module 115 and the decoding module 125 are geographically separated and communicate with each other via the communication network 120.

In the embodiment of FIG. 1B, the video input module 105 may be located at the premises of the video content providers, and the adapting scaling module 110 and the encoding module 115 may be located at one or more locations other than the video content provider locations. For example, the adapting scaling module 110 and/or the encoding module may be located in the cloud or at a location of a third party service provider.

In the illustrated embodiments of FIGS. 1A and 1B, the decoding module 125 may be located in a set-top box or a unit (STB/STU) coupled to a television system.

Figure 2A:
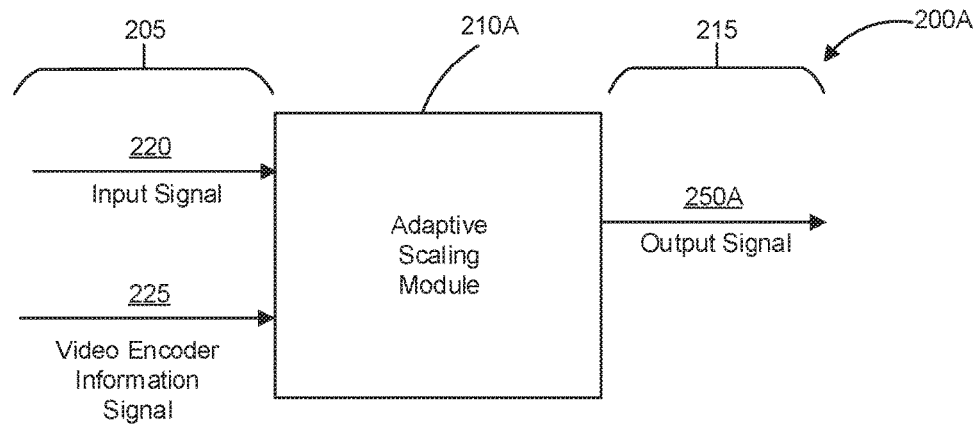
FIG. 2A is a simplified block diagram of a video compression system according to an example embodiment.

Reference is next made to FIGS. 2A-2E illustrating simplified block diagrams of video compression systems according to various embodiments. FIG. 2A illustrates a simplified block diagram of a video compression system 200A according to an example embodiment. Video compression system 200A comprises an input stage 205, an adaptive scaling module 210A and an output stage 215. The adaptive scaling module 210A of FIG. 2A is analogous to the adaptive scaling module 110 of FIGS. 1A and 1B.

As illustrated in FIG. 2A, the input stage 205 comprises an input signal 220 and a video encoder information signal 225. The output stage 215 comprises an output signal 250A. The input signal 220 is a video signal received from a video input module, such as the video input module 105 of FIG. 1A, and is intended to be transmitted to an end user's set-top box. The input signal 220 consists of many frames, and in some cases, may be categorized into numerous segments.

Video encoder information signal 225 is a data signal received from an encoding module, such as the encoding module 115 of FIG. 100A. Video encoder information signal 225 includes an indicia of the type of video encoder being used in the video compression system.

In the embodiment of FIG. 2A, the adaptive scaling module 210A analyzes the video encoder information signal 225, and horizontally scales down the resolution of the input signal 220 based on the video encoder information signal 225. In some cases, the input signal 220 is horizontally scaled on a frame by frame basis. In some other cases, the input signal 220 is horizontally scaled on a segment by segment basis, in which one or more frames within each segment are scaled, but not all the frames of the input signal 220. In various cases, the input signal 220 is horizontally downscaled to a predetermined resolution.

In some cases, the adaptive scaling module 210A comprises a database, such as a look-up table, that has pre-stored information regarding how much horizontal scaling to carry out based on the type of the encoder being used in the video compression system. The database within the adaptive scaling module 210A may be developed based on historical data and/or experimental results.

The resulting output signal 250A is a horizontally scaled version of the input signal 220, where the output signal 250A has a different horizontal resolution than the input signal 220.

Figure 2B:
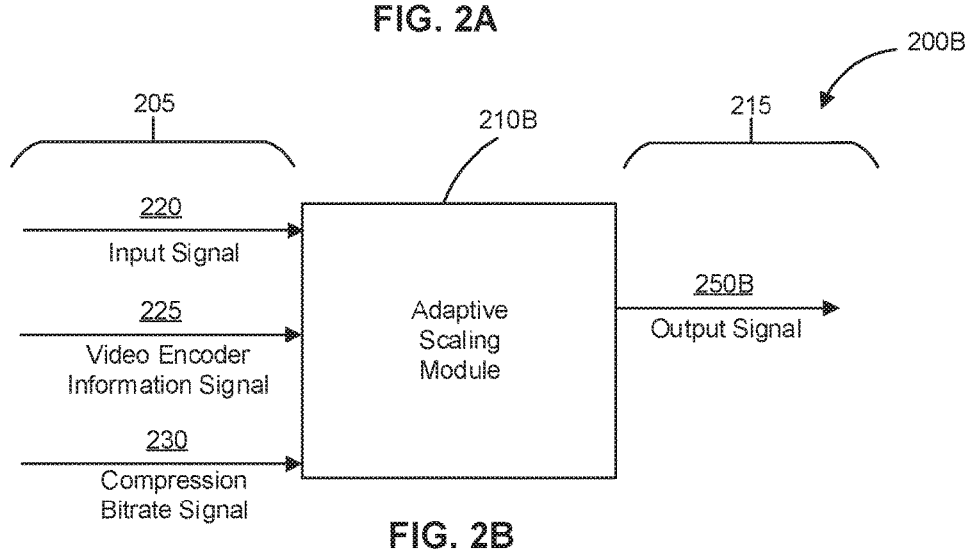
FIG. 2B is a simplified block diagram of a video compression system according to another example embodiment.

FIG. 2B illustrates a simplified block diagram of a video compression system 200B according to an example embodiment. Video compression system 200B comprises an input stage 205, an adaptive scaling module 210B and an output stage 215. The adaptive scaling module 210B of FIG. 2B is analogous to the adaptive scaling module 110 of FIGS. 1A and 1B and the adaptive scaling module 210A of FIG. 2A.

As illustrated in FIG. 2B, the input stage 205 comprises an input signal 220, a video encoder information signal 225 and compression bitrate signal 230. The input signal 220 of FIG. 2B is analogous to the input signal 220 of FIG. 2A, and the video encoder information signal 225 of FIG. 2B is analogous to the video encoder information signal 225 of FIG. 2A. The output stage 215 comprises an output signal 250B.

In this embodiment, the compression bitrate signal 230 is a data signal also received from an encoding module, such as the encoding module 115 of FIG. 100A. Compression bitrate signal 230 includes information related to instantaneous compression bitrate being used by the encoding module within the video compression system.

Compression bitrate used in a video compression system may be a constant bitrate (CBR) or a variable bitrate (VBR). Constant bitrate or CBR is typically used if the incoming video signal contains a similar motion level across the entire duration. In a constant bitrate encoding, a set bitrate is used over the entire video signal. In a variable bitrate or VBR encoding, the compression bitrate changes over the entire video signal in that a different segments of the video signal may be encoded at different bitrates. In a variable bitrate or VBR encoding, the compression bitrate is typically selected from a predefined range of acceptable bitrates required by the encoder.

In the embodiment of FIG. 2B, the adaptive scaling module 210B analyzes the compression bitrate signal 230, and horizontally scales down the resolution of the input signal 220 based on the compression bitrate signal 230. In various cases, the adaptive scaling module 210B constantly receives the instantaneous compression bitrate for each segment or each frame of the input signal 220, and horizontally scales the segment or the frame of the input signal 220 based on this information.

In some cases, the adaptive scaling module 210B comprises a database, such as a look-up table, that has pre-stored information regarding how much horizontal scaling to carry out based on the instantaneous compression bitrate being used by the encoder in the video compression system. The database within the adaptive scaling module 210B may be developed based on historical data and/or experimental results.

The resulting output signal 250B is a horizontally scaled version of the input signal 220, where the output signal 250B has a different horizontal resolution than the input signal 220.

Figure 2C:
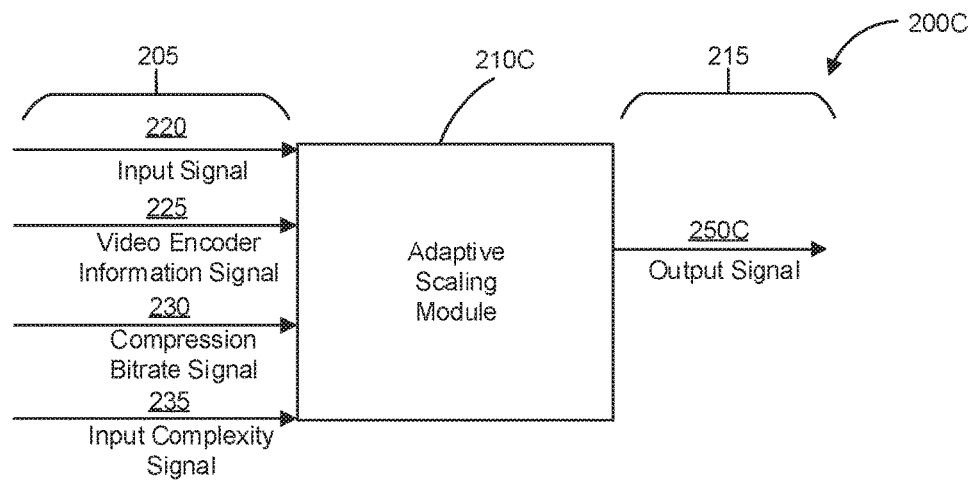
FIG. 2C is a simplified block diagram of a video compression system according to a further example embodiment.
Figure 2D:
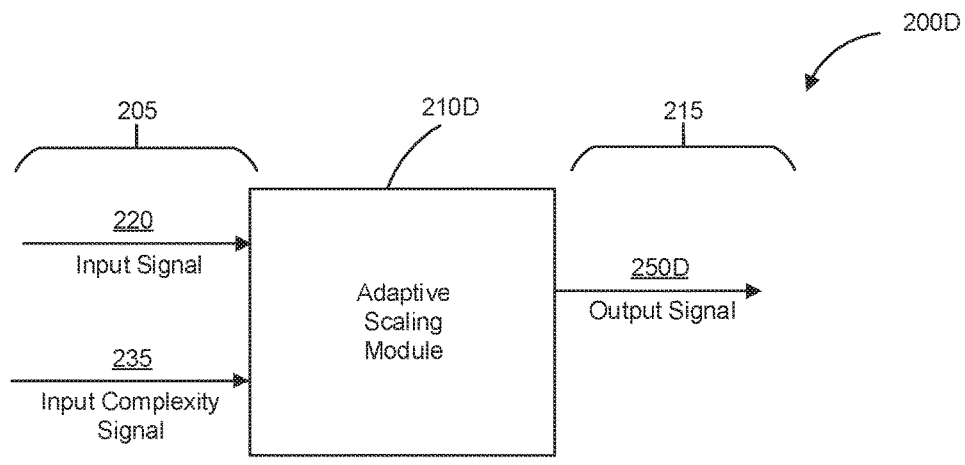
FIG. 2D is a simplified block diagram of a video compression system according to another example embodiment.

Reference is next made to FIG. 2D, which illustrates a simplified block diagram of a video compression system 200D according to an example embodiment. Video compression system 200D comprises an input stage 205, an adaptive scaling module 210D and an output stage 215. The adaptive scaling module 210D of FIG. 2D is analogous to the adaptive scaling module 110 of FIGS. 1A and 1B and the adaptive scaling modules 210A and 210B of FIGS. 2A and 2B respectively.

As illustrated in FIG. 2D, the input stage 205 comprises an input signal 220 and an input complexity signal 235. The input signal 220 of FIG. 2D is analogous to the input signal 220 of FIG. 2A. The output stage 215 comprises an output signal 250D.

In this embodiment, the input complexity signal 235 is a data signal that provides an indication of the complexity of the input signal 220. For example, the input complexity signal 235 may include information relating to texture complexity of the input signal 220, motion complexity of the input signal 220 and/or or any other indicia of the visual complexity of the input signal 220.

In the embodiment of FIG. 2D, the adaptive scaling module 210D analyzes the input complexity signal 235, and horizontally scales down the resolution of the input signal 220 based on the input complexity signal 235. In some other embodiments, the adaptive scaling module 210D analyzes the complexity of the input signal 220 itself.

In various embodiments, the adaptive scaling module 210D consists of a frame pipeline of length 10-15 frames (approximately, 300-500 ms) to facilitate a look ahead into the input signal 220 to more accurately predict the complexity of the input signal 220. The adaptive scaling module 210D is operable to compute the spatial activity of the pipelined frames of the input signal 220. The computed spatial activity is expressed as an intra-correlation. In some cases, the spatial activity, and accordingly the intra-correlation, of the input signal 220 is computed at a pre-processing stage, prior to the input signal 220 being received by the adaptive scaling module 210D. In such cases, the spatial activity or the intra-correlation information is provided to the adaptive scaling module 210D as a part of the input complexity signal 235. The pre-processing stage may be carried out by a separate module within the video compression system.

The adaptive scaling module 210D is also operable to compute the temporal activity of the pipelined frames of the input signal 220. The computed temporal activity is expressed as inter-correlation. In some cases, the temporal activity, and accordingly the inter-correlation, of the input signal 220 is computed at a motion-estimation stage, prior to the input signal 220 being received by the adaptive scaling module 210D. In such cases, the temporal activity or the inter-correlation information is provided to the adaptive scaling module 210D as a part of the input complexity signal 235. The motion-estimation stage may be carried out by a separate module within the video compression system.

The adaptive scaling module 210D is further operable to detect a change or fading of a scene within the input signal 220 during the pre-processing and the motion-estimation stages. The scene change/fade detection may also be carried out by a separate module within the video compression system, and this information may be provided to the adaptive scaling module 210D as part of the input complexity signal 235.

The adaptive scaling module 210D is further operable to receive and analyze the input complexity signal 235, including the spatial activity or the intra-correlation information, the temporal activity or the inter-correlation information and/or the scene change/fade detection information, and determine the horizontal scaling ratio of the resolution of the input signal 220 based on the input complexity signal 235.

In various cases, the adaptive scaling module 210D determines the horizontal scaling ratio of the resolution of the input signal 220 based on the spatial activity or the intra-score information, and the temporal activity or the inter-score information, as well as the scene change/fade detection information. By scaling the input signal 220 based on the scene change/fade detection information, the scaling can be aligned to scene changes or abrupt changes in motion, which does not affect the visual quality of the input signal 220 as much.

Once the horizontal scaling ratio of the resolution of the input signal 220 is determined, the adaptive scaling module 210D may be further operable to tag the pipelined frames or segments with the desired output resolution (or horizontal scaling ratio).

In the various embodiments illustrated herein, the adaptive scaling module 210D may be further configured to generate a texture complexity level between 0-5. Similarly, the adaptive scaling module 210D may be further configured to generate a motion complexity level between 0-5.

In such embodiments, the adaptive scaling module 210D comprises a database, such as a look-up table, which provides a desired output resolution (or horizontal scaling ratio) based on the texture complexity level and the motion complexity level. In some cases, the database or the look-up table is modified based on subjective tests. Table 1 illustrates an example of a 2-dimensional look-up tables stored within the adaptive scaling module 210D to provide a desired horizontal resolution of an output video signal 250D based on the texture complexity level and the motion complexity level of the input signal 220.

TABLE 1

2-dimensional look-up table for deriving horizontal resolution of an output signal

| | | Motion Complexity Level | | | | |
|---|---|---|---|---|---|---|
| | | 0 | 1 | 2 | 3 | 4 |
| Texture Complexity | 0 | 1280 | 1280 | 1280 | 1440 | 1440 |
| Level | 1 | 1280 | 1280 | 1440 | 1920 | 1440 |
| | 2 | 1280 | 1440 | 1920 | 1440 | 1280 |
| | 3 | 1440 | 1920 | 1440 | 1280 | 1280 |
| | 4 | 1440 | 1440 | 1280 | 1280 | 1280 |

Although, the determination of signal complexity of the video signal 220 is discussed above as being carried out by the adaptive scaling module 210D only, it will be understood that one or more other components of the video compression system may also be operable to analyze and determine the complexity of the input signal 220, whether exclusively or in collaboration with the adaptive scaling module 210D.

In the embodiment of FIG. 2D, the adaptive scaling module 210D is further operable to horizontally scale down the resolution of the input signal 220 based on the desired output resolution (or horizontal scaling ratio) as determined by the adaptive scaling module 210D based on the input complexity signal 235.

FIG. 2C illustrates a simplified block diagram of a video compression system 200C according to an example embodiment. Video compression system 200C comprises an input stage 205, an adaptive scaling module 210C and an output stage 215. The adaptive scaling module 210C of FIG. 2C is analogous to the adaptive scaling module 110 of FIGS. 1A and 1B and the adaptive scaling modules 210A and 210B of FIGS. 2A and 2B respectively.

As illustrated in FIG. 2C, the input stage 205 comprises an input signal 220, a video encoder information signal 225, compression bitrate signal 230 and an input complexity signal 235. The input signal 220 of FIG. 2C is analogous to the input signal 220 of FIG. 2A, the video encoder information signal 225 of FIG. 2C is analogous to the video encoder information signal 225 of FIG. 2A, the compression bitrate signal 230 of FIG. 2C is analogous to the compression bitrate signal 230 of FIG. 2B, and the input complexity signal 235 of FIG. 2C is analogous to the input complexity signal 235 of FIG. 2D. The output stage 215 comprises an output signal 250C.

In the embodiment of FIG. 2C, the adaptive scaling module 210C analyzes the video encoder information signal 225, the compression bitrate signal 230 and the input complexity signal 235, and horizontally scales down the resolution of the input signal 220 based on these data signals.

In some cases, the adaptive scaling module 210C is operable to consider the instantaneous compression bitrate included in the compression bitrate signal 230 and modify the database or the look-up table of Table 1 above to accommodate bitrate feedback from the encoder.

The resulting output signal 250C is a horizontally scaled version of the input signal 220, where the output signal 250C has a different horizontal resolution than the input signal 220.

Figure 2E:
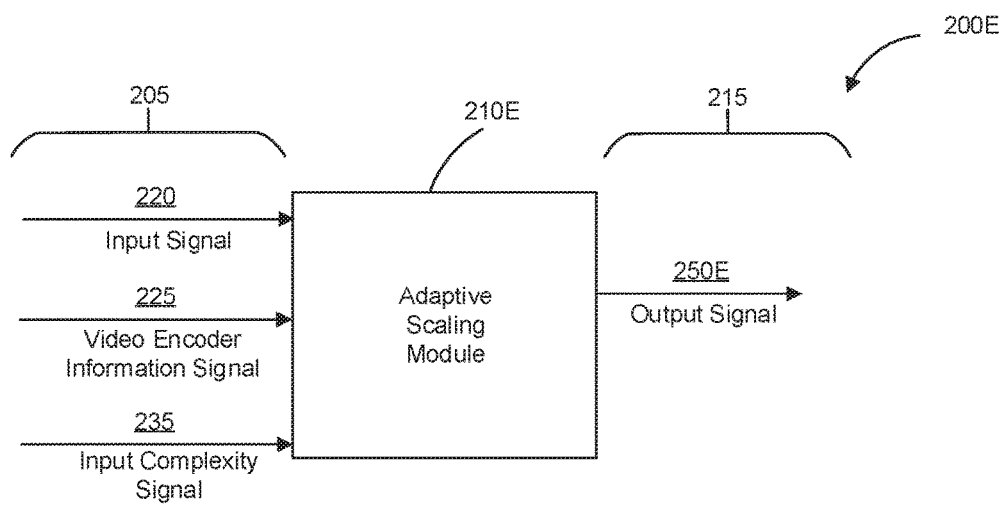
FIG. 2E is a simplified block diagram of a video compression system according to another example embodiment.

Reference is next made to FIG. 2E, which illustrates a simplified block diagram of a video compression system 200E according to an example embodiment. Video compression system 200E comprises an input stage 205, an adaptive scaling module 210E and an output stage 215. The adaptive scaling module 210E of FIG. 2E is analogous to the adaptive scaling module 110 of FIGS. 1A and 1B and the adaptive scaling modules 210A, 210B and 210C of FIGS. 2A, 2B and 2C respectively.

As illustrated in FIG. 2E, the input stage 205 comprises an input signal 220, a video encoder information signal 225 and an input complexity signal 235. The input signal 220 of FIG. 2E is analogous to the input signal 220 of FIG. 2A, the video encoder information signal 225 of FIG. 2E is analogous to the video encoder information signal 225 of FIG. 2A, and the input complexity signal 235 of FIG. 2E is analogous to input complexity signal 235 of FIG. 2D. The output stage 215 comprises an output signal 250E.

Figure 3:
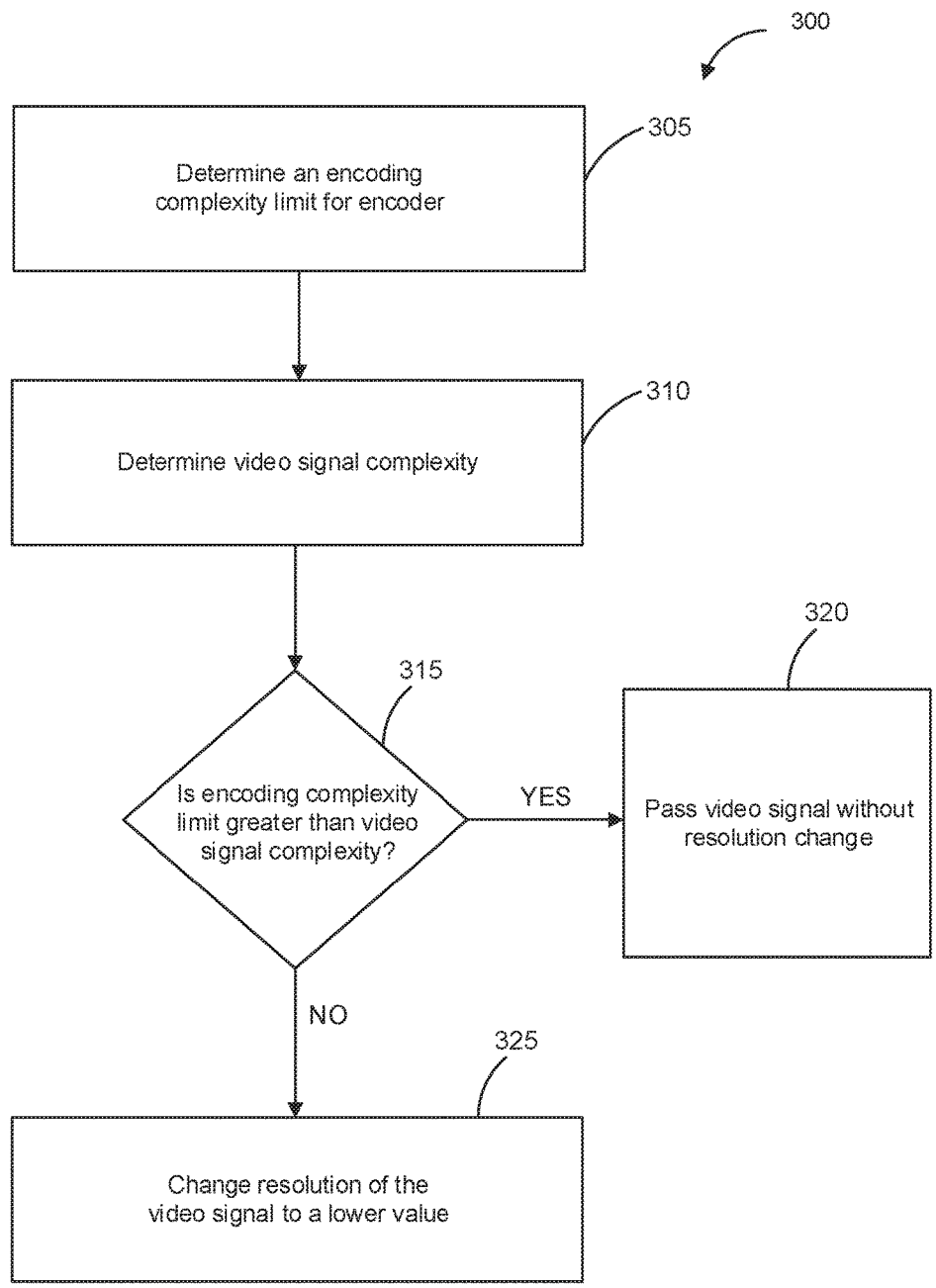
FIG. 3 is a flowchart diagram illustrating a method for operation of a video compression system according to an example embodiment.

Reference is simultaneously made to FIG. 3, which illustrates a flowchart diagram illustrating a method 300 for operation of a video compression system in accordance with the example embodiment of FIG. 2E.

In the illustrated embodiment of FIGS. 2E and 3, the steps 305-325 of method 300 are carried out by the adaptive scaling module 210E. At 305, the adaptive scaling module 210E determines an encoding complexity limit for an encoding module, such as the encoding module 115 of FIGS. 1A and 1B. The encoding complexity limit represents the range of signal complexity that the encoder being used in the video compression system can comfortably compress without (or with very little and often tolerable) visible visual distortion. The encoding complexity limit information is provided to the adaptive scaling module 210E by the video encoder information signal 225 of FIG. 2E.

At 310, the adaptive scaling module 210E determines the complexity level of the incoming video signal 220. In the embodiment of FIG. 3, the complexity level of the incoming video signal 220 can be determined based on the embodiment of FIG. 2D, where the adaptive scaling module 210E may generate texture complexity information of the input signal 220, motion complexity information of the input signal 220 and/or or any other indicia of the visual complexity of the input signal 220, such as change in scene etc.

At 315, the adaptive scaling module 210E compares the encoding complexity limit of the encoder, determined at 305, to the input signal complexity level, determined at 310, and determines if the encoding complexity level is greater than video signal complexity. If the encoding complexity level is determined to be greater than the video signal complexity, then at 320, the input signal 220 is passed to the next stage within the video compression system without any change.

However, if the video signal complexity is determined to be greater than the encoding complexity level, then at 325, the resolution of the input signal 220 is downscaled before the video signal is passed onto the next stage within the video compression system. In various embodiments disclosed herein, the input signal 220 is horizontally downscaled at 325.

Figure 4A:
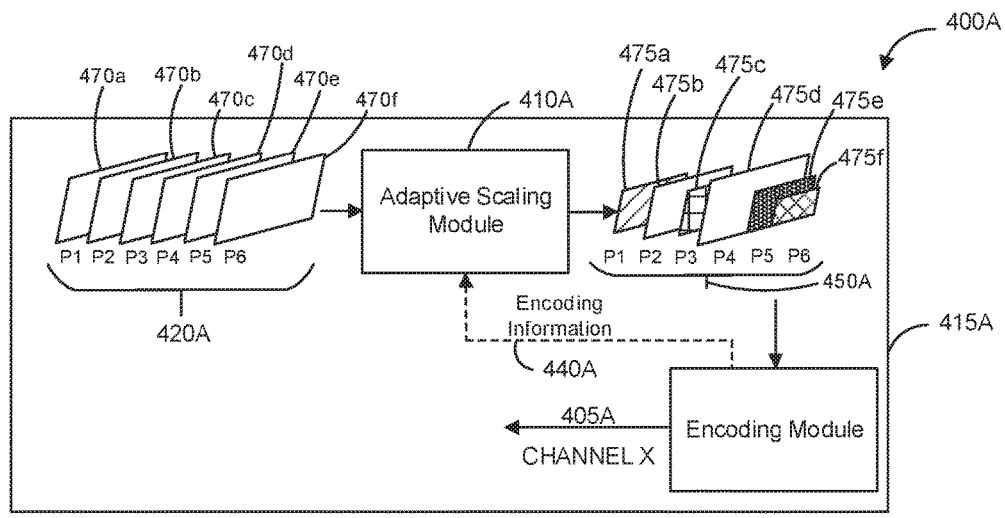
FIG. 4A is a video compression system according to an example embodiment.

Reference is next made to FIG. 4A, which illustrates a video compression system 400A according to an example embodiment. System 400A comprises an input signal 420A, an adaptive scaling module 410A, an output signal 450A and encoding module 415A.

In the illustrated embodiment, the input signal 420A comprises a plurality of picture segments, including a first picture segment 470a, a second picture segment 470b, a third picture segment 470c, a fourth picture segment 470d, a fifth picture segment 470e and a sixth picture segment 470f. In some cases, each picture segment 470a-470f corresponds to an individual frame of the video input signal 420A. In some other cases, each picture segment 470a-470f corresponds to a group of frames of the video input signal 420A.

The adaptive scaling module 410A corresponds to any other adaptive scaling module disclosed here, such as the adaptive scaling module 110 of FIGS. 1A and 1B, and adaptive scaling modules 210A-210E of FIGS. 2A-2E. The adaptive scaling module 410A is operable to receive the input signal 420A and an information signal 440A from the encoding module 415A. The information signal 440A may include information relating to the encoder used in the video compression system. The information signal 440A may additionally or alternatively include information relating to the instantaneous compression bitrate from the encoding module 415A. In addition, the adaptive scaling module 410A may be further operable to analyze the complexity of the input signal 420A to determine motion, texture and/or other indicia of complexity of the input signal 420A.

The adaptive scaling module 410A is then operable to horizontally scale one or more picture segments 470a-470f based on the information signal 440A from the encoding module 415A and/or input signal complexity information, as discussed above in various embodiments of FIGS. 2A-2E and FIG. 3.

The output of the adaptive scaling module 410A is an output signal 450A, including a first output picture segment 475a, a second output picture segment 475b, a third output picture segment 475c, a fourth output picture segment 475d, a fifth output picture segment 475e and a sixth picture segment 475f. As illustrated in this embodiment, not all output picture segments 475a-475f are horizontally scaled versions of the corresponding input picture segments 470a-470f.

Since different input picture segments 470a-470f may have different signal complexities, different picture segments 470a-470f are treated differently. As a result, in the illustrated embodiment, the output signal 450A includes output picture segments 475a-475f, of which some are unchanged (such as the second output picture segment 475b and the fourth output picture segment 475d), some are horizontally scaled down to three-fourths of the original horizontal resolution (such as the fifth output picture segment 475e), and some are horizontally scaled down to one-third of the original horizontal resolution (such as the first output picture segment 475a and the third output picture segment 475c), and some are horizontally scaled down to one-half of the original horizontal resolution (such as the sixth output picture segment 475f).

The output signal 450A, including picture segments 475a-475f of different horizontal resolutions, is then forwarded to the encoding module 415A for compression. In the illustrated embodiment, the encoding module 415A is analogous to encoding module 115 of FIGS. 1A and 1B, and is operable to compress the output signal 450A to yield a compressed output signal, referred to herein as 'channel x', 405A.

Figure 4B:
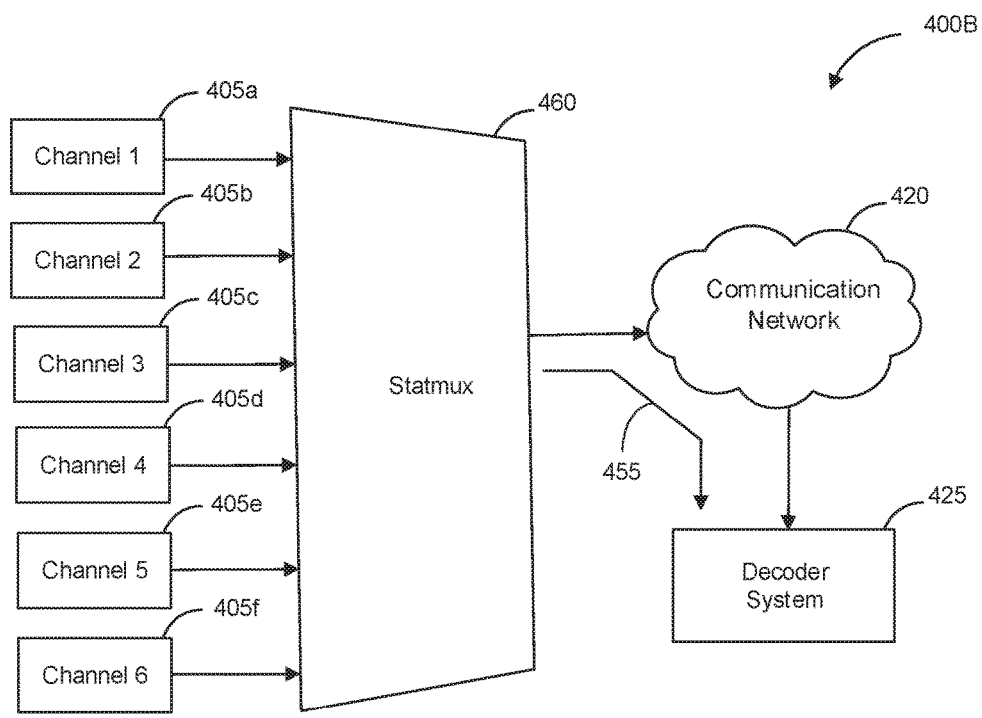
FIG. 4B is a video compression system according to another example embodiment.

Reference is next made to FIG. 4B, which illustrates a video compression system 400B according to an example embodiment. Video compression system 400B comprises a plurality of channels 405a-405f, a statistical multiplexer (statmux) 460, a communication network 420 and a decoder system 425. In the illustrated embodiment, the communication network 420 is analogous to the communication network 120 of FIGS. 1A and 1B. Similarly, decoder system 425 is analogous to the decoding module 125 of FIGS. 1A and 1B.

Cable providers typically transmit video signals corresponding to more than one channel to an end user via a communication network 420. For an HD delivery, a cable provider is typically only able to transmit four (4) HD channels given the bandwidth typically available to the cable providers. However, in the illustrated embodiment, at least six (6) HD channels can be multiplexed together and transmitted over the same bandwidth to the end user. The latter is facilitated by carrying out the process of horizontal scaling of the input signals before compression.

In the illustrated embodiment, each channel 405a-405f is analogous to channel 405A of FIG. 4A in that each channel has been analyzed for horizontal scaling (and in some cases, has been horizontally scaled) and then encoded. The system 400B is illustrated to include six channels, including a first channel 405a, a second channel 405b, a third channel 405c, a fourth channel 405d, a fifth channel 405e and a sixth channel 405f.

The statmux 460 is operable to receive signals corresponding to each channel 405a-405f and generate a multiplexed signal 455 for transmission to the end user. This may have the advantage of providing the cable providers with an improvement in channel density by a factor of 33% by moving from a 4:1 statmux pool to a 6:1 statmux pool of HD channels with no effect on subjective video quality.

The decoder system 425 receives the multiplexed signal 455 and is operable to separate the various channels within the multiplexed signal, decompress each channel and for each channel, horizontally upscale one or more output picture segments back to their original resolution before displaying the channel to the end user.

Disclosed next are the objective experiment results performed on a video compression system including an adaptive scaling module as disclosed in the various embodiments here. Table 2 below illustrates these objective experimental results. The following results are based on a MPEG2 codec with input signals to the video compression system being HD input videos. For the purposes of the experiment, the adaptive scaling module is set to apply only horizontal downscaling with the following resolutions: i) 1920×1080, ii) 1440×1080, iii) 1280×1080 and iv) 960×1080.

TABLE 2

Objective experimental results illustrating effect of bitrate and resolution on objective quality

|  | 1920 × 1080 | | | 1440 × 1080 | | | 1280 × 1080 | | |
|  | 3M | 6M | 12M | 3M | 6M | 12M | 3M | 6M | 12M |
|  | PSNR(dB) | | | PSNR difference vs 1920 | | | PSNR difference vs 1920 | | |
|---|---|---|---|---|---|---|---|---|---|
| BasketBall | 26.15 | 35.33 | 39.95 | 2.54 | 1.42 | 0.47 | 3.34 | 1.80 | 0.54 |
| Intothetrees | 30.56 | 32.31 | 34.07 | 0.29 | 0.18 | 0.14 | 0.33 | 0.23 | 0.17 |
| Model | 26.95 | 34.11 | 38.65 | 1.28 | 0.02 | −1.66 | 2.12 | −0.09 | −2.24 |
| Parkjoy | 23.14 | 25.46 | 28.00 | 0.64 | 0.40 | 0.39 | 0.88 | 0.56 | 0.35 |
| Soccer | 24.56 | 26.93 | 28.64 | 0.50 | 0.34 | 0.03 | 0.53 | 0.30 | −0.01 |
| Stockholm | 32.85 | 34.95 | 36.29 | 0.25 | −0.06 | 0.05 | 0.19 | −0.06 | 0.00 |

As illustrated in Table 2, the peak signal to noise ratio (PSNR) numbers for stream with scaled resolution are generated after scaling back to the original resolution. The results in the columns for scaled video (i.e. for resolutions of 1440×1080 and 1280×1080) are PSNR differences between the scaled and the non-scaled case (i.e. for resolution of 1920×1080). The results clearly demonstrate that objective quality is significantly improved by scaling the video before encoding, as indicated by positive PSNR values. The objective experimental results are also categorized based on different bitrates. The bitrates tested are typical bitrates observed in the statmux 4:1 pool with a pool video bitrate of 35.5 Mbps. The objective experimental results are also categorized based on various videos of different complexities (arranged in Table 2 in the order of low to high complexity).

In addition to the objective experimental results discussed above, the videos of Table 2 were also subjectively evaluated at similar bitrates as mentioned in the above table. In the range of 3-6 Mbps the complex parts of the video coded looked similar or slightly better than the stream coded in the original resolution. In addition, in some cases, coding artifacts are more tolerable than scaling artifacts.

For very complex content, subjective experimentation yielded that lower the resolution, the better the visual quality. However, for very simple content, not much gain was found by scaling the video. However, at the same time, not much degradation was observed by encoding at lower resolution, suggesting scaling before encoding for videos with simple content as well.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. The scope of the claims should not be limited by the preferred embodiments and examples, but should be given the broadest interpretation consistent with the description as a whole.

The invention claimed is:

1. A method of operating a video compression system, the method comprising:
    determining an encoding complexity limit for an encoding module within the video compression system;
    determining signal complexity of an input signal to the video compression system;
    comparing the encoding complexity limit to the signal complexity at an adaptive scaling module within the video compression system; and
    if the signal complexity is determined to be greater than the encoding complexity limit, scaling a resolution of the input signal in a horizontal direction while maintaining the resolution in a vertical direction, at the adaptive scaling module, to generate an output signal and providing the generated output signal to the encoding module.

2. The method of claim 1, further comprising:
    encoding the output signal at the encoding module to generate an encoded signal, wherein the encoding is carried out subsequent to the scaling of the resolution of the input signal.

3. The method of claim 2, further comprising:
    transmitting the encoded signal to a decoding module, wherein the decoding module decompresses the encoded signal to generate a decompressed signal and upscales the decompressed signal to an original resolution of the corresponding input signal.

4. The method of claim 3, wherein the decoding module is located at a set-top box at a consumer premises.

5. The method of claim 1, wherein if the encoding complexity limit is determined to be greater than the signal complexity, the method comprises:
    encoding the input signal at the encoding module to generate an encoded signal.

6. The method of claim 1, wherein scaling the input signal in the horizontal direction allows for a same codec to be used for compressing/decompressing the output signal as the input signal.

7. The method of claim 5, wherein scaling the input signal in the horizontal direction is proportional to the signal complexity of the input signal.

8. The method of claim 1, further comprising:
    determining an instantaneous compression bitrate for the input signal; and
    scaling the resolution of the input signal based on the instantaneous compression bitrate of the input signal.

9. The method of claim 1, wherein determining the encoding complexity limit for an encoding module is based on a type of codec used within the video compression system.

10. A video compression system comprising:
    a memory module;
    a video input module coupled to the memory module, the video input module configured to receive an input signal;

an encoding module coupled to the memory module and the video input module;

an adaptive scaling module coupled to the memory module, the video input module and the encoding module, the adaptive scaling module being operable to:
   i. determine an encoding complexity limit for the encoding module;
   ii. determine signal complexity of the input signal;
   iii. compare the encoding complexity limit to the signal complexity;
   iv. scale a resolution of the input signal in a horizontal direction while maintaining the resolution in a vertical direction, if the signal complexity is determined to be greater than the encoding complexity limit; and
   v. generate an output signal and provide the output signal to an encoding module; and an encoding module configured to encode the output signal.

11. The video compression system of claim 10, wherein the adaptive scaling module is configured to encode the input signal at the encoding module to generate an encoded signal if the encoding complexity limit is determined to be greater than the signal complexity.

12. The video compression system of claim 10, wherein downscaling the input signal in the horizontal direction allows for a same codec to be used for compressing/decompressing the output signal as the input signal.

13. The video compression system of claim 10, wherein the adaptive scaling module is configured to downscale the input signal in the horizontal direction based on signal complexity of the input signal.

14. The video compression system of claim 10, wherein the adaptive scaling module is configured to determine an instantaneous compression bitrate for the input signal and scale the resolution of the input signal based on the instantaneous compression bitrate of the input signal.

15. The video compression system of claim 10, further comprising a decoding module, wherein the decoding module is configured to decompress the encoded signal to generate a decompressed signal and upscale the decompressed signal to an original resolution of the corresponding input signal.

16. The video compression system of claim 10, wherein the decoding module is located at a set-top box at a consumer premises.

17. The video compression system of claim 10, wherein the adaptive scaling module is configured to determine the encoding complexity limit for the encoding module based on a type of codec used within the video compression system.

18. A non-transitory computer-readable medium storing computer-executable instructions, the instructions for causing at least one processor to perform a method of operating a video compression system, the method comprising:

determining an encoding complexity limit for an encoding module within the video compression system;

determining signal complexity of an input signal to the video compression system;

comparing the encoding complexity limit to the signal complexity at an adaptive scaling module within the video compression system; and if the signal complexity is determined to be greater than the encoding complexity limit, scaling a resolution of the input signal in a horizontal direction while maintaining the resolution in a vertical direction, at the adaptive scaling module, to generate an output signal and providing the generated output signal to the encoding module.

\* \* \* \* \*